United States Patent
Murray et al.

[15] 3,676,394

[45] July 11, 1972

[54] ANTIOZONANT RUBBER COMPOSITIONS

[72] Inventors: Robert W. Murray, Warren, N.J.; Paul R. Story, Athens, Ga.

[73] Assignee: Bell Telephone Laboratories, Incorporated, Murray Hill, Berkeley Heights, N.J.

[22] Filed: Nov. 10, 1969

[21] Appl. No.: 871,652

Related U.S. Application Data

[63] Continuation of Ser. No. 717,048, March 27, 1968, abandoned, which is a continuation of Ser. No. 650,209, June 30, 1967, abandoned, which is a continuation-in-part of Ser. No. 490,736, Sept. 27, 1965, abandoned.

[52] U.S. Cl. .......................... 260/45.9 R, 260/801, 260/814
[51] Int. Cl. ..................................... C08c 27/68, C08f 45/60
[58] Field of Search .......................... 260/45.9, 801; 252/401

[56] References Cited

UNITED STATES PATENTS

| | | | |
|---|---|---|---|
| 2,829,121 | 4/1958 | Leeper | 260/45.9 |
| 2,058,615 | 10/1936 | Morton | 260/809 |
| 2,382,792 | 8/1945 | Howland | 260/45.9 |
| 2,697,700 | 12/1954 | Urancer | 260/45.9 |
| 2,729,691 | 1/1956 | DePree | 260/45.9 |
| 3,098,841 | 7/1963 | Morris et al. | 260/45.9 |

FOREIGN PATENTS OR APPLICATIONS

| | | | |
|---|---|---|---|
| 545,381 | 8/1957 | Canada | 260/45.9 |

OTHER PUBLICATIONS

Symposium on Effect of Ozone on Rubber– ASTM Special Technical Publication No. 229, American Society for Testing & Materials; pp. 39– 56 Phila., Pa. U.S. Patent Office Sci. Lib. OTS 1892 A45s. February 10, 1958.

1965 Book of ASTM Standards– Part 28, American Society for Testing and Materials, pp. 559 to 566.

*Primary Examiner*—Donald E. Czaja
*Assistant Examiner*—V. P. Hoke
*Attorney*—R. J. Guenther and Edwin B. Cave

[57] ABSTRACT

Vulcanized rubbery polymers may be effectively protected against ozone cracking by incorporation therein of certain non-primary aliphatic diamines, triamines and tetramines.

5 Claims, No Drawings

ANTIOZONANT RUBBER COMPOSITIONS

This is a continuation of application Ser. No. 717,048, filed Mar. 27, 1968 now abandoned, which is a continuation of application Ser. No. 650,209, filed June 30, 1967 now abandoned, which is in turn a continuation-in-part of application Ser. No. 490,736, fiied Sept. 27, 1965 now abandoned by Robert W. Murray and Paul R. Story.

This invention relates to the protection of rubber from the degradative consequences of attack by ozone. More particularly, the present invention relates to the use of certain amines as antiozonants for synthetic and natural rubbers.

It is well known that articles manufactured from synthetic and natural rubbers by vulcanization are subject to cracking upon prolonged exposure to the atmosphere, such cracking being attributed to small quantities of ozone in the atmosphere. Accordingly, workers in the art have proposed a wide variety of antiozonants which are designed to counteract the deleterious effects of ozone. Unfortunately, the vast majority of these compositions become discolored under the influence of light or result in staining of the rubber, so limiting their use to dark-colored rubbers including those containing carbon black. Those compositions which did not become discolored or stained were found not to be free of the degradation due to ozone attack. Thus, the search has continued for an effective antiozonant which is not subject to the described deficiencies.

In accordance with the present invention antiozonants meeting the desired criteria are described. It has been found that compounds of the general formulas

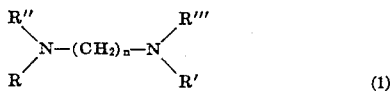

and

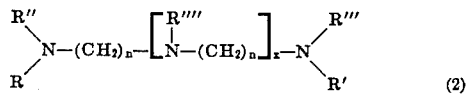

are uniquely adapted for protecting natural and synthetic rubbers against the action of ozone while evidencing little or no discoloration under the influence of light and being stain-free. In the noted formulas R and R' each represents an aliphatic alkyl group having from 1 to 10 carbon atoms. R'', R''' and R'''' may be hydrogen or an unsubstituted aliphatic alkyl group having from one to 10 carbon atoms. In formula (1), $n$ may be an integer from one to 10 whereas in formula (2), $n$ and $x$ may each be an integer from one to two.

The rubbers protected by the antiozonants described herein may be defined as inclusive of any sulfur vulcanizable rubber, natural or synthetic, which is susceptible to attack by ozone. It will be understood by those skilled in the art that such terminology includes both the rubbery homopolymers and copolymers of butadiene and isoprene, such as polybutadiene rubber, polyisoprene rubber, sytrene-butadiene rubber, isobutylene-isoprene copolymer rubber, et cetera. For the purposes of the present invention, the preferred rubbers are the polymers of butadiene and isoprene (homopolymers and copolymers), but it will be understood that the described antiozonants are effective in any of the noted rubbers. The triamines and tetramines described herein are of primary interest for use in conjunction with sytrene-butadiene rubbery polymers.

In the practice of the present invention, it has been found necessary to employ from 3.5 to 10 parts of the antiozonant of formula (1) per 100 parts of rubber, by weight, when $n$ ranges from 1–3 and the sum of the carbon atoms in R, R', R'' and R''' is less than five, and from 0.25–10 parts per hundred parts of rubber when $n$ ranges from 1–3 and the sum of the carbon atoms in R, R', R'' and R''' is at least five and when $n$ ranges from 4–10. The use of less than the noted minimum fails to result in satisfactory protection due to chemical reaction with the components of the mixture and because of high volatility. Increasing the amount of antiozonant beyond the noted maximum fails to result in any further improvement. Regarding the compositions of formula (2), it has been found necessary to employ from 0.25–10 parts of antiozonant per 100 parts of rubber, by weight. The factors dictating the limits alluded to above similarly dictate the compositional limitations of this material as well as the availability of materials.

In the preparation of the rubbers described herein, conventional softening agents, accelerators, fillers and antioxidants may be added and the resultant composition vulcanized and shaped by any of the well known prior art procedures. It will also be understood that the described compositions may be used with monocrystalline or paraffin waxes or blends of both in the usual manner of compounding to achieve a formulation which will resist ozone-caused cracking.

The amines utilized in the practice of the present invention may conveniently be obtained by reacting a suitable alkyl dichloride, for example, ethylene dichloride, with ammonia to yield the corresponding diamine, triamine, etc. The resultant compounds may then be converted to the desired compounds by reductive alkylation, id est, by hydrogenating a mixture of the amine and a suitable ketone or aldehyde over a Raney nickel or platinum catalyst.

A more detailed illustration of the present invention is set forth in the following examples.

EXAMPLE I 100.0 parts, by weight, of styrene-butadiene rubber, 5.0 parts, by weight, of zinc oxide, 1.0 part, by weight, of stearic acid and 4.0 parts, by weight of sulfur were mixed together. To this mixture which was employed as a control, 1.0 part, by weight, of an accelerator, N-cyclohexyl-2-benzothiazole sulfenamide, was added. (Samples with amine antiozonants do not require the accelerator to achieve comparable cures.) The resultant composition was cured at 140° C. Following, the cured composition was cut in 6 inch by ½ inch strips, which were subsequently put on test racks and stretched to 20 per cent elongation and exposed to 25 parts per hundred million of ozone at 35° C. (ASTM-D1149–62T). Cracking time, that is, the first observation of any cracks with the unaided eye, was then noted. The control cracked within 50 hours.

For comparative purposes, the procedure described was repeated in the absence of the accelerator with the noted concentration of antiozonant, equivalent states of cure being employed in all cases. The results are set forth in Table I.

TABLE I

| Antiozonant | Concentration (parts per hundred rubber) | Time to Cracking |
|---|---|---|
| N,N'-diethyl | 1 | 7 weeks |
| 1,6,-hexanediamine | 3 | 32 weeks |
| 1,6,-hexanediamine | 5 | >44 weeks |
| N,N'-dimethyl | 3.5 | >51 weeks |
| 1,3,-propanediamine | 5 | >51 weeks |
| N,N'-dimethyl | 3.5 | >32 weeks |
| ethylenediamine | 5 | >28 weeks |
| N, N'-diethyl | 3.5 | >68 weeks |
| ethylenediamine | 5 | >68 weeks |

Additionally, it was noted that the samples containing the antiozonants of the invention evidenced little or no discoloration or staining prior to cracking.

EXAMPLE II

The procedure of Example I was repeated with a mixture comprising 100.0 parts, by weight, of styrene-butadiene rubber, 5.0 parts, by weight, of zinc oxide, 1.0 parts, by weight, of stearic acid, 4.0 parts, by weight, of sulfur, 10.0 parts, by weight, of titanium dioxide (a whitener), 10.0 parts, by weight, of silicon dioxide (a whitener), and 1.5 parts, by weight, of N-cyclohexyl-2-benzothiozole sulfenamide. The control evidenced cracking, within 48 hours. Addition of antiozonants of the invention resulted in compositions which did not evidence discoloration or staining prior to cracking. The results of these tests are shown in Table II.

TABLE II

| Antiozonant | Concentration (parts per hundred rubber) | Time to Cracking |
|---|---|---|
| N,N'-diethyl-1,6-hexanediamine | 1 | 6 days |
| N,N'-diethyl-1,6-hexanediamine | 3 | >97 weeks |
| N,N'-diethyl-1,6-hexanediamine | 5 | >34 weeks |
| N,N'-dimethylethylenediamine | 3.5 | >103 weeks |
| N,N'-dimethylethylenediamine | 5 | >82 weeks |
| N,N'-dimethyl-1,3-propane diamine | 3.5 | >5 weeks |
| N,N'-dimethyl-1,3-propane diamine | 5 | >5 weeks |
| N,N'-dimethyl-1,4-butane diamine | 1 | >4 days |
| N,N'-dimethyl-1,4-butane diamine | 3 | >32 weeks |
| N,N'-dimethyl-1,4-butane diamine | 5 | >103 weeks |
| N,N'-diethylethylenediamine | 3.5 | >103 weeks |
| N,N'-diethylethylenediamine | 5 | >103 weeks |
| N,N'-diethyl-1,4-butane diamine | 1 | 1 week |
| N,N'-diethyl-1,4-butane diamine | 1 | 1 week |
| N,N'-diethyl-1,4-butane diamine | 5 | >103 weeks |
| N,N'-dipropylethylenediamine | 1 | 3 days |
| N,N'-dipropylethylenediamine | 3 | 9 days |
| N,N'-dipropylethylenediamine | 5 | >60 weeks |

EXAMPLE III

The procedure of Example II was repeated with the exception that 100.0 parts, by weight, of isoprene rubber were substituted for the styrene-butadiene rubber. The control evidenced cracking, staining and discoloration within 4 days. Addition of antiozonants of the invention resulted in compositions which did not evidence discoloration or staining prior to cracking. The results of these tests are shown in Table III.

TABLE III

| Antiozonant | Concentration (parts per hundred rubber) | Time to Cracking |
|---|---|---|
| N,N'-dimethyl-1,3-propane diamine | 3.5 | 24 days |
| N,N'-dimethyl-1,3-propane diamine | 5 | 24 days |
| N,N'-dimethyl-1,4-butane diamine | 1 | 11 days |
| N,N'-dimethyl-1,6-hexane-diamine | 0.25 | 12 days |
| N,N'-dimethyl-1,6-hexane-diamine | 0.50 | 14 days |
| N,N'-dimethyl-1,6-hexane-diamine | 1.0 | 8 days |
| N,N'-diethyl-1,4-butane-diamine | 0.25 | 19 days |
| N,N'-diethyl-1,4-butane-diamine | 0.50 | 14 days |
| N,N'-diethyl-1,4-butane-diamine | 1.0 | 14 days |
| N,N'-dipropylethylenediamine | 0.25 | 23 days |
| N,N'-dipropylethylenediamine | 0.50 | 23 days |
| N,N'-dipropylethylenediamine | 1.00 | 21 days |
| N,N'-dibutylethylenediamine | 0.25 | 21 days |
| N,N'-dibutylethylenediamine | 0.50 | 23 days |
| N,N'-dibutylethylenediamine | 1.00 | 9 days |

It will be noted that increasing amounts of antiozonants enhances the protection of the styrene-butadiene compositions of Examples I and II whereas lower concentrations of antiozonant yield optimum protection for the isoprene rubber composition of Example III.

EXAMPLE IV

The procedure of Example II was repeated employing the secondary-tertiary amines noted in Table IV. No discoloration or staining was apparent prior to cracking.

TABLE IV

| Antiozonant | Concentration (parts per hundred rubber) | Time to Cracking |
|---|---|---|
| N,N,N'-trimethylethylenediamine | 3.5 | 33 days |
| N,N,N'-trimethyl-1,3-propanediamine | 3.5 | >5 weeks |
| N,N,N'-trimethyl-1,3-propanediamine | 5 | >5 weeks |

EXAMPLE V

The procedure of Example III was repeated employing the secondary-tertiary amines noted in Table V. No discoloration or staining was apparent prior to cracking.

TABLE V

| Antiozonant | Concentration (parts per hundred rubber) | Time to Cracking |
|---|---|---|
| N,N,N'-trimethyl-1,3-propanediamine | 3.5 | 33 days |
| N,N,N'-trimethyl-1,3-propanediamine | 5 | 33 days |
| N,N,N'-trimethylethylenediamine | 3.5 | 4 weeks |
| N,N,N'-trimethylethylenediamine | 5 | 4 weeks |

EXAMPLE VI

The procedure of Example I was repeated employing the ditertiary amine noted in Table VI. No discoloration or staining was apparent prior to cracking.

TABLE VI

| Antiozonant | Concentration (parts per hundred rubber) | Time to Cracking |
|---|---|---|
| N,N,N',N'-tetramethylethylenediamine | 3.5 | 8 days |
| N,N,N',N'-tetramethylethylenediamine | 5 | 6 weeks |

EXAMPLE VII

The procedure of Example II was repeated employing the ditertiary amine noted in Table VII. No discoloration or staining was apparent prior to cracking.

TABLE VII

| Antiozonant | Concentration (parts per hundred rubber) | Time to Cracking |
|---|---|---|

| Antiozonant | Concentration (parts per hundred rubber) | Time to Cracking |
|---|---|---|
| N,N,N',N'-tetramethylethylenediamine | 3.5 | 12 days |
| N,N,N',N'-tetramethylethylenediamine | 5 | 12 days |

EXAMPLE VIII

The procedure of Example III was repeated employing the ditertiary amines noted in Table VIII. No discoloration or staining was apparent prior to cracking.

TABLE VIII

| Antiozonant | Concentration (parts per hundred rubber) | Time to Cracking |
|---|---|---|
| N,N,N',N'-tetramethylethylenediamine | 3.5 | 16 days |
| N,N,N',N'-tetramethylethylenediamine | 5 | 30 days |
| N,N,N',N'-tetraethylethylenediamine | 1 | 25 days |
| N,N,N',N'Tetraethylethylenediamine | 3 | 25 days |
| N,N,N',N'-tetraethylethylenediamine | 5 | 25 days |

EXAMPLE IX

The procedure of Example II was repeated employing the tetramine and the triamine noted in Table IX. No discoloration nor staining was apparent prior to cracking.

TABLE IX

| Antiozonant | Concentration (parts per hundred rubber) | Time to Cracking |
|---|---|---|
| 1,4,7,10-tetramethyl-triethylenetetramine | 2 | >16 weeks |
| triethylenetetramine | 3 | >16 weeks |
| triethylenetetramine | 4 | >16 weeks |
| triethylenetetramine | 5 | >32 weeks |
| triethylenetetramine | 6 | >16 weeks |
| 1,4,5-triethyl-diethylenetriamine | 1 | 12 days |
| 1,4,7-triethyl-diethylenetriamine | 3 | >16 weeks |
| 1,4,7-triethyl-diethylenetriamine | 5 | >16 weeks |

EXAMPLE X

The procedure of Example II was repeated and outdoor static ozone tests were made. The test pieces were ½ inch in width and were wound around mandrels so as to yield a maximum strain of 20 per cent. The test racks were mounted outdoors facing South and inclined at 45°. The control cracked in 10 days. The results of the test are set forth in Table X below.

TABLE X (Outdoor Ozone Test Results)

| Antiozonant | Concentration (parts per hundred rubber) | Time to Cracking |
|---|---|---|
| 1,4,7,10-tetramethyl-trimethylenetetramine | 1 | 21 days |
| trimethylenetetramine | 2 | 21 days |
| trimethylenetetramine | 5 | 28 days |
| 1,4,7-triethyl-diethylenediamine | 1 | 21 days |
| 1,4,7-triethyl-diethylenediamine | 3 | >7 months |
| 1,4,7-triethyl-diethylenediamine | 5 | >7 months |

We claim:

1. A stain-free, nondiscoloring composition comprising a vulcanized rubbery polymer susceptible to attack by ozone and from 0.25–10 parts per 100 parts of rubber, by weight, of an antiozonant consisting essentially of a composition having the general formula

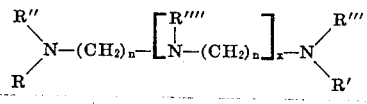

wherein R and R' are selected from the group consisting of aliphatic alkyl radicals having from one to 10 carbon atoms and R'', R''', and R'''' are selected from the group consisting of hydrogen and aliphatic alkyl radicals having from one to 10 carbon atoms, $n$ and $x$ being integers from 1–2, said composition being free from the presence of any discoloring material.

2. A composition in accordance with claim 1 wherein said antiozonant is a triamine.

3. A composition in accordance with claim 1 wherein said antiozonant is a tetramine.

4. A composition in accordance with claim 2 wherein said antiozonant is a di-secondary-tertiary amine.

5. A composition in accordance with claim 3 wherein said antiozonant is a di-secondary-di-tertiary amine.

* * * * *